US012015540B2

United States Patent
Rigamonti et al.

(10) Patent No.: US 12,015,540 B2
(45) Date of Patent: Jun. 18, 2024

(54) DISTRIBUTED DATA GRID ROUTING FOR CLUSTERS MANAGED USING CONTAINER ORCHESTRATION SERVICES

(71) Applicant: Red Hat, Inc., Raleigh, NC (US)

(72) Inventors: Vittorio Rigamonti, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 26 days.

(21) Appl. No.: 17/468,257

(22) Filed: Sep. 7, 2021

(65) Prior Publication Data

US 2023/0074530 A1 Mar. 9, 2023

(51) Int. Cl.
*H04L 45/121* (2022.01)
*H04L 9/06* (2006.01)
*H04L 9/08* (2006.01)
*H04L 45/02* (2022.01)
*H04L 45/122* (2022.01)
*H04L 45/42* (2022.01)
*H04L 67/2895* (2022.01)

(52) U.S. Cl.
CPC .......... *H04L 45/121* (2013.01); *H04L 9/0643* (2013.01); *H04L 9/0825* (2013.01); *H04L 45/02* (2013.01); *H04L 45/122* (2013.01); *H04L 45/42* (2013.01); *H04L 67/2895* (2013.01)

(58) Field of Classification Search
CPC ..... H04L 9/0825; H04L 45/02; H04L 45/122; H04L 45/42; H04L 67/2895
USPC .......................................................... 709/238
See application file for complete search history.

(56) References Cited

U.S. PATENT DOCUMENTS

| 8,886,804 | B2 | 11/2014 | Osmond |
| 9,621,409 | B2 | 4/2017 | Oliver et al. |
| 10,038,626 | B2 | 7/2018 | Sorenson, III et al. |
| 10,360,233 | B2 | 7/2019 | Bussler et al. |
| 10,785,334 | B2 * | 9/2020 | Kristiansson ....... G06F 16/2255 |
| 11,392,422 | B1 * | 7/2022 | Filiz ..................... G06F 9/45558 |

(Continued)

FOREIGN PATENT DOCUMENTS

CN        112860695 A     5/2021

OTHER PUBLICATIONS

Wenwu Tang, Shaowen Wang, "High Performance Computing for Geospatial Applications", Springer, 2020 (Year: 2020).*

(Continued)

*Primary Examiner* — Wing F Chan
*Assistant Examiner* — John Fan
(74) *Attorney, Agent, or Firm* — Kilpatrick Townsend & Stockton, LLP

(57) ABSTRACT

A cloud-native architecture for containerized systems using consistent hashing routing is described. A reverse proxy server executing on a container-based cluster of compute nodes managed using a container orchestration service may determine a current data grid topology. The reverse proxy server may receive a first request from a first client device to retrieve first data from the container-based cluster of compute nodes. The request may be parsed to determine a key of a key-value pair and a hash value may be computed using the key. A consistent hashing algorithm may be executed to determine a node associated with the hash value. The first data may be retrieved from the node using the hash value. The first data may be sent to the first client device.

17 Claims, 6 Drawing Sheets

(56) References Cited

U.S. PATENT DOCUMENTS

2016/0253386 A1\* 9/2016 Burns ................... H04L 67/125
                                                              707/758
2018/0270129 A1\* 9/2018 Kulshreshtha ........ G06F 16/173
2020/0192690 A1\* 6/2020 Gupta ................... G06F 9/5077
2020/0403786 A1\* 12/2020 de Matos ............ G06F 21/6218
2021/0157769 A1   5/2021 Orlinski et al.
2021/0342193 A1\* 11/2021 Anand ................ G06F 11/3447
2022/0075610 A1\* 3/2022 Wang ........................ G06F 8/71

OTHER PUBLICATIONS

Xiang et al.; Consistent hashing with bounded loads and virtual nodes-based load balancing strategy for proxy cache cluster; Cluster Computing; Feb. 25, 2020; pp. 3139-3155; Issue 23.

Author Unkown; System, Method, and Apparatus to Optimize Load Balancing Using Affinity-Based Consistent Hashing in Solving Skewed Resource Utilization Among Multiple Application Server Instances or Clusters; IP.com; Mar. 2, 2021; 9 pgs; IP.com No. IPCOM000265133D.

Author unknown; SwimRing—A Minimal Distributed Fault-Tolerant Key-Value Store built with SWIM Gossip Protocol and Consistent Hash Ring; Jul. 12, 2016; 6 pgs; Retrieved from https://github.com/hungys/swimring on Jul. 3, 2021.

\* cited by examiner

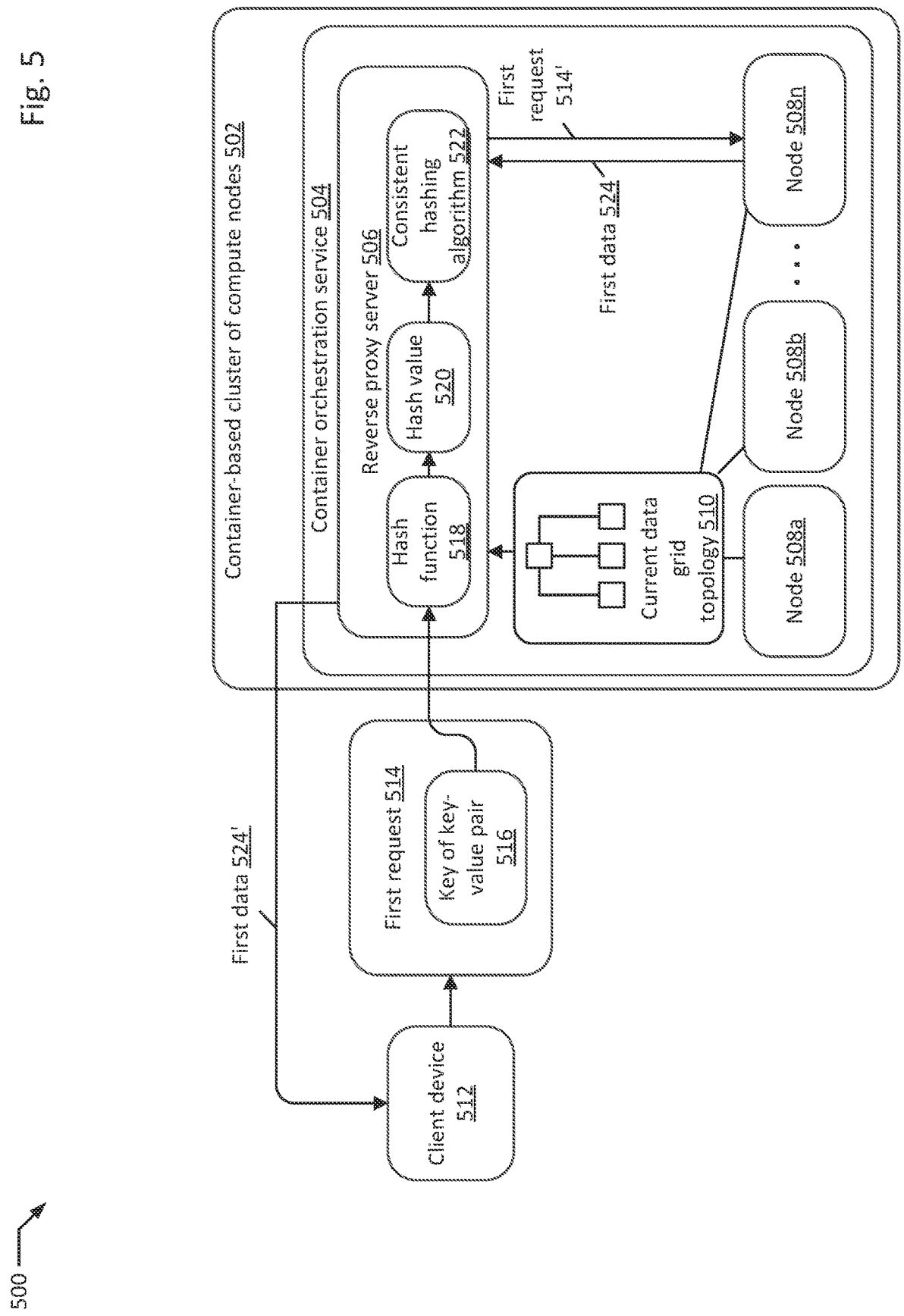

DISTRIBUTED DATA GRID ROUTING FOR CLUSTERS MANAGED USING CONTAINER ORCHESTRATION SERVICES

BACKGROUND

Trusted execution environments (TEEs), such as virtual machines and/or containers may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

A cluster of trusted execution environments may offer distributed computing services in a cloud-based architecture to a variety of clients. Many such clusters offer a distributed data grid that pools together the random access memory of clustered devices/TEEs to allow applications to share data with other applications running in the cluster.

SUMMARY

The present disclosure provides new and innovative systems and methods for routing requests to a distributed data grid executing on a cluster managed using container orchestration services. In an example, a system includes a container-based cluster of compute nodes managed using a container orchestration service. The system may further include a reverse proxy server executing on the container-based cluster of compute nodes. In various examples, the reverse proxy server may be configured to determine a current data grid topology of the container-based cluster of compute nodes. In some cases, the reverse proxy server may be configured to receive, from a client device, a first request to retrieve first data from the container-based cluster of compute nodes. In various examples, the proxy server may be further configured to parse the first request to determine a key of a key-value pair included in the first request. In some examples, the proxy server may be further configured to compute a hash value by inputting the key into a hash function. The proxy server may be further configured to determine, using a consistent hashing algorithm executed by the reverse proxy server, at least one node among the container-based cluster of compute nodes associated with the hash value. The reverse proxy server may send the first request to the at least one node. The reverse proxy server may receive the first data from the at least one node in response to the first request. In yet other examples, the reverse proxy server may be configured to send the first data to the client device.

In an example, a method includes determining, by a reverse proxy server executing on a container-based cluster of compute nodes managed using a container orchestration service, a current data grid topology of the container-based cluster of compute nodes. The method may include receiving, by the reverse proxy server from a client device, a first request to retrieve first data from the container-based cluster of compute nodes. The method may also include parsing, by the reverse proxy server, the first request to determine a key of a key-value pair included in the first request. The method may further include computing, by the reverse proxy server, a hash value by inputting the key into a hash function. The method may also include determining, using a consistent hashing algorithm executed by the reverse proxy server, at least one node among the container-based cluster of compute nodes associated with the hash value. The method may include sending, by the reverse proxy server, the first request to the at least one node. The method may further include receiving, by the reverse proxy server, the first data from the at least one node in response to the first request. In some examples, the method may include sending the first data to the client device.

In some examples, a non-transitory machine-readable medium may store a program which, when executed by a processor, may cause a reverse proxy server executing on a container-based cluster of compute nodes to determine a current data grid topology of the container-based cluster of compute nodes. In some cases, the program may further cause the reverse proxy server to receive, from a client device, a first request to retrieve first data from the container-based cluster of compute nodes, wherein the container-based cluster of compute nodes is managed using a container orchestration service. In some examples, the program may further cause the reverse proxy server to parse the first request to determine a key of a key-value pair included in the first request. In some examples, the program may further cause the reverse proxy server to compute a hash value by inputting the key into a hash function. In various cases, the program may further cause the reverse proxy server to determine, using a consistent hashing algorithm executed by the reverse proxy server, at least one node among the container-based cluster of compute nodes associated with the hash value. The program may further cause the reverse proxy server to send the first request to the at least one node. The program may cause the reverse proxy server to receive the first data from the at least one node in response to the first request. In some cases, the program may further cause the reverse proxy server to send the first data to the client device.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 5 is block diagram of a reverse proxy server executing on a container-based cluster of compute nodes and communicating with a client device, according to an example of the present disclosure.

DETAILED DESCRIPTION OF EXAMPLE EMBODIMENTS

Figure 1:
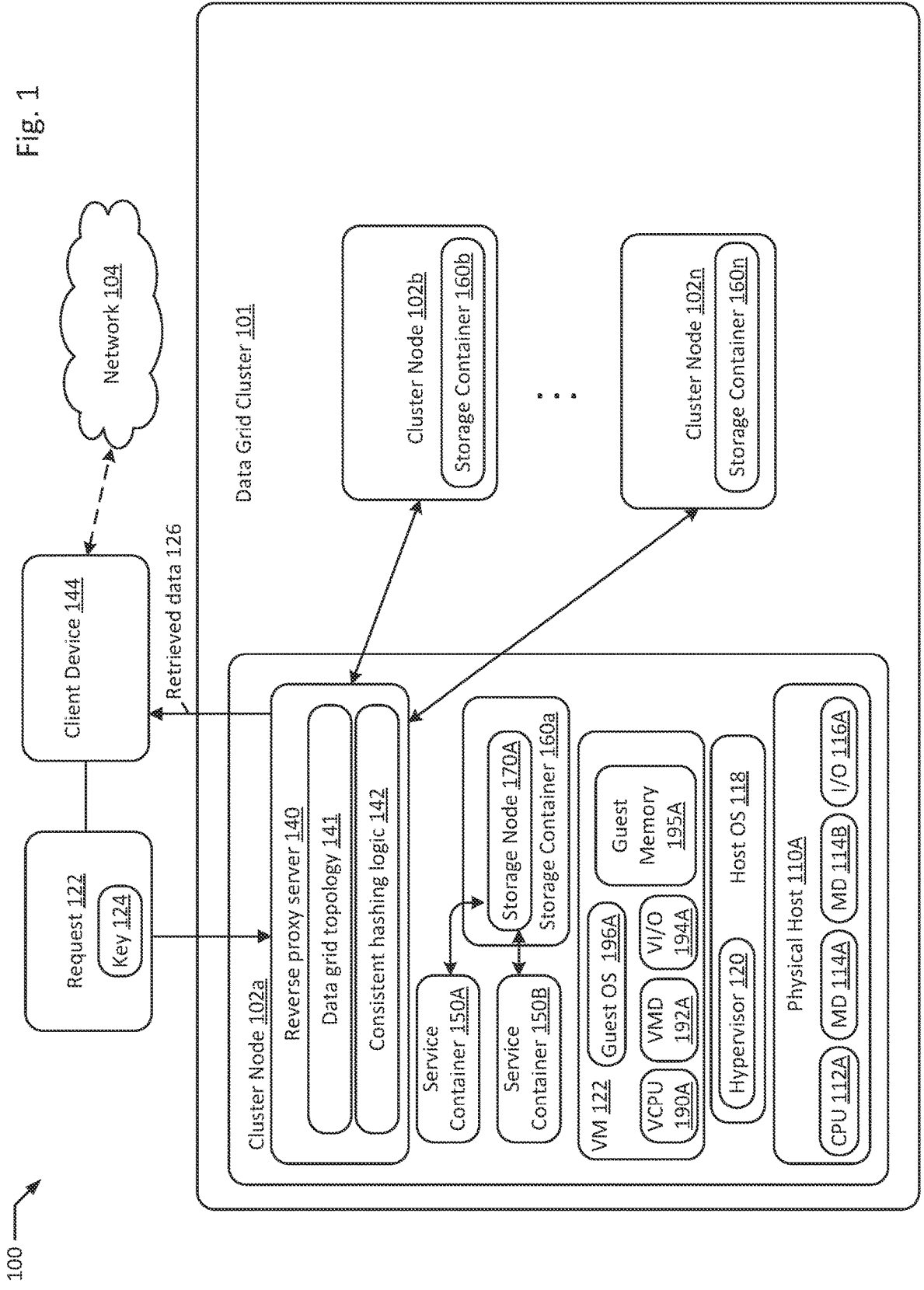
FIG. 1 is a block diagram of a client device requesting data from a container-based cluster of compute nodes, according to various examples of the present disclosure.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container-based virtualization system, for example, a "cluster" of such resources that is managed by a container manager (sometimes referred to as a "container orchestration service") such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®, Docker Swarm®), generally respond to frequent container startups and cleanups with low latency. Containers may enable wide spread, parallel deployment of computing power for specific tasks. In a typical example, a container may be instantiated to process a specific task and may be reaped (e.g., un-instantiated) after the task is complete.

Compute services, such as content delivery networks (CDNs), Video Analytics as a Service, Retail as a Service, and other compute services are often deployed across a multitude of compute nodes. Each service may have different compute resource requirements such as compute capacity, network latency, cache and storage requirements, etc. Traditionally, compute resources for a compute service are deployed within a single cluster of compute nodes. A cluster of compute nodes, as used herein, refers to compute nodes on which an orchestration framework has been deployed (e.g., Kubernetes®, Docker Swarm®, etc.).

Data grids are sets of clustered nodes that pool together memory (e.g., RAM) to allow applications to store/retrieve data and to allow applications to share data with other applications executing on the cluster. Data grids are typically designed for large-scale applications that need more RAM than is typically available in a single server. Such data grids are designed to high speed (low latency) data processing.

Many distributed data grids are designed using key-value stores (e.g., Infinispan®) that share entries across different nodes. An entry (e.g., data representing the value of a key-value pair) is usually stored on a subset of the data grid nodes. A data grid node that stores an entry is referred to as an "owner" of that entry. Entries are often distributed on the data grid cluster using a consistent hashing algorithm. Consistent hashing selects a data grid node for storage of data as a function of the entry's key and the cluster configuration of the data grid. The cluster configuration of the distributed data grid is often referred to as the "data grid topology."

Consistent hashing refers to algorithms that map data objects to a set of n nodes. For example, consider a load balancing problem where a set of data objects (e.g., web pages, video segments, or any other type of data) is to be assigned to the set of n nodes. The set of objects may be distributed evenly across then nodes using a standard hash function to store object o in a node with id hash(o) (mod n). However, if a node is added or removed from the cluster (as commonly occurs—resulting in the value n changing), the node assignment of nearly every object in the data grid may change. In a cluster where nodes are continually spun up/reaped this is problematic as it may require a large proportion of data objects to be reassigned and moved to different nodes.

Consistent hashing may be used to avoid node reassignment for data objects when a node is added or removed from the data grid. In consistent hashing, a hash function is used to randomly map both objects and nodes to a unit circle (e.g., at an angle of hash(o) (mod 360°) with respect to a horizontal axis. Each object o is assigned to the next node that appears on the circle (e.g., in clockwise order). This provides an even distribution of objects to nodes. If a node is unable to accommodate a particular object (e.g., where a node has insufficient memory), the object may be allocated to the next node on the circle. Additionally, if a node fails (and is thus removed from the unit circle), only the objects that are owned by that node are reassigned to the next node (e.g., in clockwise order or counterclockwise order, depending on the consistent hashing algorithm). Similarly, if a new node is spun up, the node may be added to the unit circle and only objects owned by that node are reassigned. Importantly, when a node is added or removed, the vast majority of objects maintain their previous node affiliation. In addition to resizing, the data grid topology may be used with the consistent hashing algorithm to consistently determine on which node an object (e.g., data) will be stored.

A client (e.g., an application) can issue a request (e.g., to retrieve and/or store data) to any node of a data grid cluster. However, if the request is sent to a non-owner node of the cluster, the request will need to be propagated to an owner node in order to be served. Such re-routing is a performance issue. In order to address such an issue, clients are typically equipped with logic enabling the client to determine the correct owner node and to thereby send the request directly to the owner node.

However, clusters of containers managed using a container orchestration service such as Red Hat® OpenShift®, Kubernetes®, etc., are designed to be application agnostic. These container orchestration services take control of instances of software and use their own request-routing logic. Often, such routing logic uses common services such as LoadBalancer/Nodeport or Route/Ingress. While such application-agnostic services may be beneficial in terms of reliability and due to simple routing logic, the routing logic may break the behavior of the client-side logic described above resulting in routing inefficiencies. For example, for a given client request, LoadBalancer may employ round robin logic that randomly selects a node to which to route the request. This often results in the request being propagated from node to node until an owner node is found.

Described herein, is a reverse proxy server that may be executed on the container orchestrator managed cluster that intelligently routes client requests to an appropriate owner node of the data grid. The reverse proxy server may parse each incoming client request to determine a key value included in the request. The reverse proxy server may input the key value into a hash function to determine a hash value for the key value. The reverse proxy server may repeatedly ping the data grid to determine a current data grid topology. The reverse proxy server may execute the consistent hashing algorithm using the current data grid topology to determine a segment-to-owner map that maps each segment of the hash value space to a node owner base on the current data grid topology. Accordingly, after calculating the hash value for the key, the reverse proxy server may lookup the owner node(s) and route the request accordingly.

Advantageously, moving the intelligent routing from the client to a reverse proxy server avoids the need to expose all of the data grid cluster nodes by the container orchestration service, which would be required for client-side implementation. Further, using the reverse proxy server described herein, clients need not implement the full consistent hashing algorithm in each relevant programming language. Additionally, clients are not required to set up the various network layers if the data grid topology changes. This avoids the need for the client to open and close sockets for various nodes. Otherwise, in a client-side consistent routing implementation these network layer changes would need to be implemented in each relevant programming language. Instead, the reverse proxy may expose an interface that is agnostic to programming language. Additionally, the client may now leverage other advantages of the container orchestration service, such as authentication layers, authorization layers, and scaling. Further, the reverse proxy server may include logic to determine further efficiencies and/or optimizations that may be achieved according to the current data grid topology. For example, if the reverse proxy server determines that there are two data grid owner nodes that can service a current request, the reverse proxy server may determine that the first owner node may be able to process the current request with less latency relative to the second owner node (e.g., based on the number of hops between the reverse proxy server and the owner nodes, network congestion, throughput, buffer levels, etc.).

FIG. 1 is a block diagram of a system 100 including a client device 144 requesting data from a container-based cluster of compute nodes (including cluster nodes 102a, 102b, . . . , 102n) using a reverse proxy server 140, according to various examples of the present disclosure. The system 100 may include a container-based cluster of compute nodes (including cluster nodes 102a, 102b, . . . , 102n) of a data grid cluster 101. The cluster may be managed using a container orchestration service such as Red Hat® OpenShift® or Kubernetes®. In various examples, nodes of the data grid cluster 101 and/or other devices (e.g., client device 144) may be configured in communication with one another via a network 104 (e.g., the Internet, a local area network, etc.).

Cluster node 102a may execute a reverse proxy server 140 that may be effective to route requests received from client device 144 to owner nodes of data grid cluster 101 using consistent hashing logic 142 and a current data grid topology 141, as described in further detail below. Cluster node 102a may be implemented using software, hardware, and/or some combination thereof. In the example depicted in FIG. 1, the cluster node 102a may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage container 160a, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160a and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

Other nodes (e.g., cluster nodes 102b, . . . , 102n) may store various data as part of the data grid cluster 101. Accordingly, in various examples, each of the other cluster nodes 102b, . . . , 102n may deploy one or more storage containers. In the example depicted in FIG. 1, cluster node 102b deploys storage container 160b and cluster node 102n deploys storage container 160n.

Cluster node 102a may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical CPUs 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, storage container 160a and/or service containers 150A, 150B may be similarly implemented.

In an example, in addition to distributed storage provided by storage container 160a, a storage controller may additionally manage data grid storage in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator. In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters.

In the example depicted in FIG. 1, client device 144 may send a request 122 (e.g., a request to retrieve data or store data) to reverse proxy server 140. The request 122 may include a key value 124 (e.g., a key of a key-value pair). The reverse proxy server 140 may input the key value 124 into a hash function which may output a hash value. Additionally, as described in further detail below, the reverse proxy server 140 may use a current data grid topology 141 and consistent hashing logic 142 to generate a segment-to-owner map that maps each hash value (segment) to a particular cluster node 102b . . . 102n of the data grid cluster 101. Accordingly, the reverse proxy server 140 may lookup one or more owner nodes from the segment-to-owner map using the hash value determined from key value 124. Thereafter, reverse proxy server 140 may send the request to the appropriate cluster node(s) among cluster nodes 102b, . . . , 102n. In the case where the request 122 is to retrieve data, the retrieved data 126 may be sent from the owner node to the reverse proxy server 140. The reverse proxy server 140 may send the retrieved data 126 to the client device 144.

Figure 2:
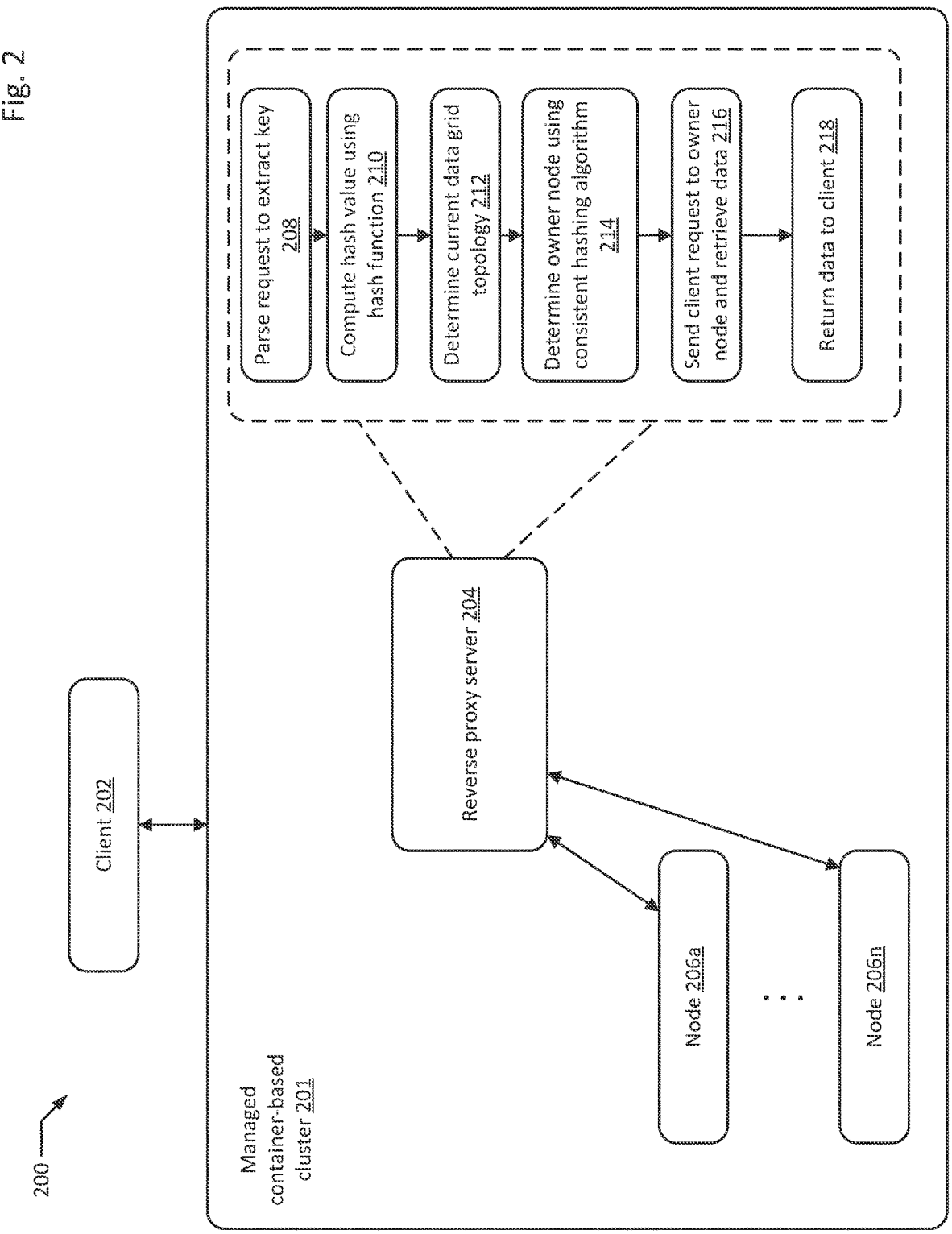
FIG. 2 is a block diagram illustrating operations performed by a reverse proxy server executing on a container-based cluster, according to various examples of the present disclosure.

FIG. 2 is a block diagram 200 illustrating operations performed by a reverse proxy server 204 executing on a container-based cluster, according to various examples of the present disclosure. As shown in FIG. 2, a client 202 may be configured in communication with a container-based cluster managed using a container orchestration service (e.g., managed container-based cluster 201). In various examples, the reverse proxy server 204 may include non-transitory computer-readable medium storing instructions that, when executed by at least one processor component, may be configured to perform the various data grid routing techniques and/or consistent hashing techniques described herein.

The managed container-based cluster 201 may execute a reverse proxy server 204 and may provide a data grid deployed over a plurality of cluster nodes including nodes 206a, . . . , 206n. The reverse proxy server 204 may be a "reverse" proxy as, contrary to a traditional proxy, where data is sent from inside a cluster or other network to the outside, a reverse proxy receives data from outside the cluster/network that is directed to a node within the cluster/network. Upon receive a request to retrieve data from client 202, reverse proxy server 204 may parse the request to extract a key (block 208) included in the request. The reverse proxy server 204 may input the key into a hash function that converts key values to hash values. Accordingly, the reverse proxy server 204 may compute a hash value corresponding to the key using the hash function (block 210). The reverse proxy server 204 may determine a current data grid topology (block 212). In an example, the data grid may send updates to the current data grid topology whenever a node is spun up (e.g., instantiated), removed (e.g., "reaped"), or has failed. For example, the reverse proxy server may subscribe via an event driven architecture to receive the current data grid topology whenever the topology is updated. Accordingly, upon a change in the data grid topology the data grid may send a message indicating the change in the data grid topology to the reverse proxy server. In other examples, the reverse proxy server 204 may periodically request a current data grid topology from the data grid.

At block 214, the reverse proxy server 204 may determine an owner node using the consistent hashing algorithm. For example, the hash value space (e.g., the range of hash values that can be computed using the hash function (e.g., integers ranging from 0-MAX_HASH_VALUE) may be partitioned into a number of segments (SEGMENTS_NUM). Segments may be mapped to the current nodes of the data grid using the consistent hashing algorithm according to the current number of available nodes of the data grid (and the current topology) to generate a segment-to-owner map which maps each segment to one or more owner nodes. The reverse proxy server 204 may determine the owner node for a given key by computing the appropriate segment S for the hash value HV corresponding to the key. The segment S for the hash value HV may be computed as S=round (HV*SEGMENT_NUM/MAX_HASH_VALUE). The segment may then be used to lookup the owner node(s) in the segment-to-owner map.

At block 216, the client request may be sent to the owner node and may be used to retrieve the data or write data (depending on the request). The client request may include the key of the key-value pair, the requested operation (e.g., get, put, delete, etc.), a value (for a put operation), a lifespan or max-idle-time (if the particular data grid implements data expiration). The key may be used to retrieve the data from the owner node. The retrieved data may be returned to the reverse proxy server. At block 218, the reverse proxy server 204 may return the retrieved data to the client 202. Accordingly, from the perspective of client 202, it may appear as though the data is retrieved directly from the reverse proxy server 204 with the reverse proxy server 204 serving as a single point of contact with the data grid.

Figure 3:
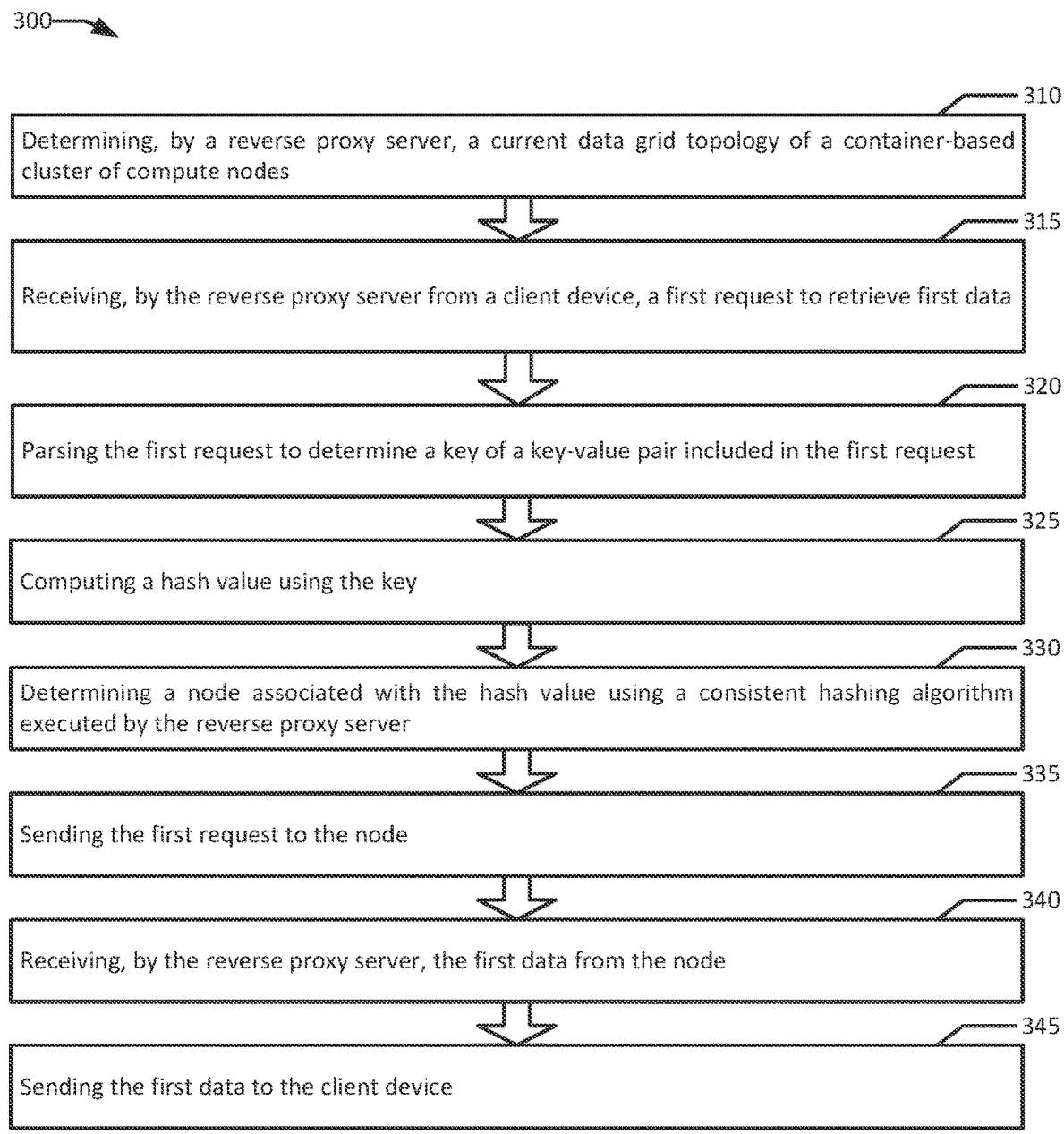
FIG. 3 is flowchart illustrating an example process for distributed data grid routing for clusters managed using a container orchestration service, according to an example of the present disclosure.

FIG. 3 illustrates a flowchart of an example process 300 for distributed data grid routing for clusters managed using a container orchestration service, in accordance with various examples of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes determining, by a reverse proxy server, a current data grid topology of a container-based cluster of compute nodes (block 310). For example, the current nodes of the data grid (deployed on a managed container-based cluster) as well as information indicating the network topology (e.g., which nodes are configured in communication with one another and/or at which hierarchical levels) may be determined. In various examples, the reverse proxy server may ping the data grid in order to receive the current data grid topology (e.g., a data grid node that provides an interface for determining information about the data grid may be pinged).

In an example, the process 300 may include receiving, by the reverse proxy server from a client device, a first request to retrieve first data (block 315). For example, the client device may request data stored by the data grid. The request may include a key associated with a key-value pair. The request may be received via an interface of the reverse proxy server that is exposed outside the managed container-based cluster.

In an example, the process 300 may include parsing the first request to determine a key of a key-value pair included in the first request (block 320). In various examples, the reverse proxy server may include logic effective to parse requests to identify a field associated with keys. The key may be extracted for routing the request according to the techniques described herein. In an example the process 300 may include computing a hash value using the key (block 325). The hash value may be computed using a pre-defined hash function. The particular hash function is implementation-specific. Examples of hash functions include the family of Secure Hash Algorithms (SHA) Curl, etc.

In an example, the process 300 may include determining a node associated with the hash value using a consistent hashing algorithm executed by the reverse proxy server (block 330). For example, as previously described, a number of segments may be calculated based on the maximum hash value. The number of segments may be divided into the current nodes (determined using the current data grid topology). The segment for the current hash value may be computed by multiplying the hash value times the ratio of the number of segments to the maximum hash value (and by rounding to the nearest segment) (e.g., S=round (HV*SEGMENTS NUM/MAX_HASH_VALUE)). The segment may be used to lookup the node owner(s) in the segment to owner map determined using the consistent hashing algorithm and the current network topology.

In an example, the process 300 may include sending the first request to the node (block 335). For example, the reverse proxy server may send the first request to each owner node identified at block 330. The owner node(s) may use the key included in the first request to lookup the requested first data (associated by the key-value pair) and may return the first data to the reverse proxy server. Accordingly, at block 340, the reverse proxy server may receive the first data from the owner node(s). At block 345, the reverse proxy server may send the first data to the client device. For example, the reverse proxy server may send the first data in response to the client's request including the key value.

Figure 4A:
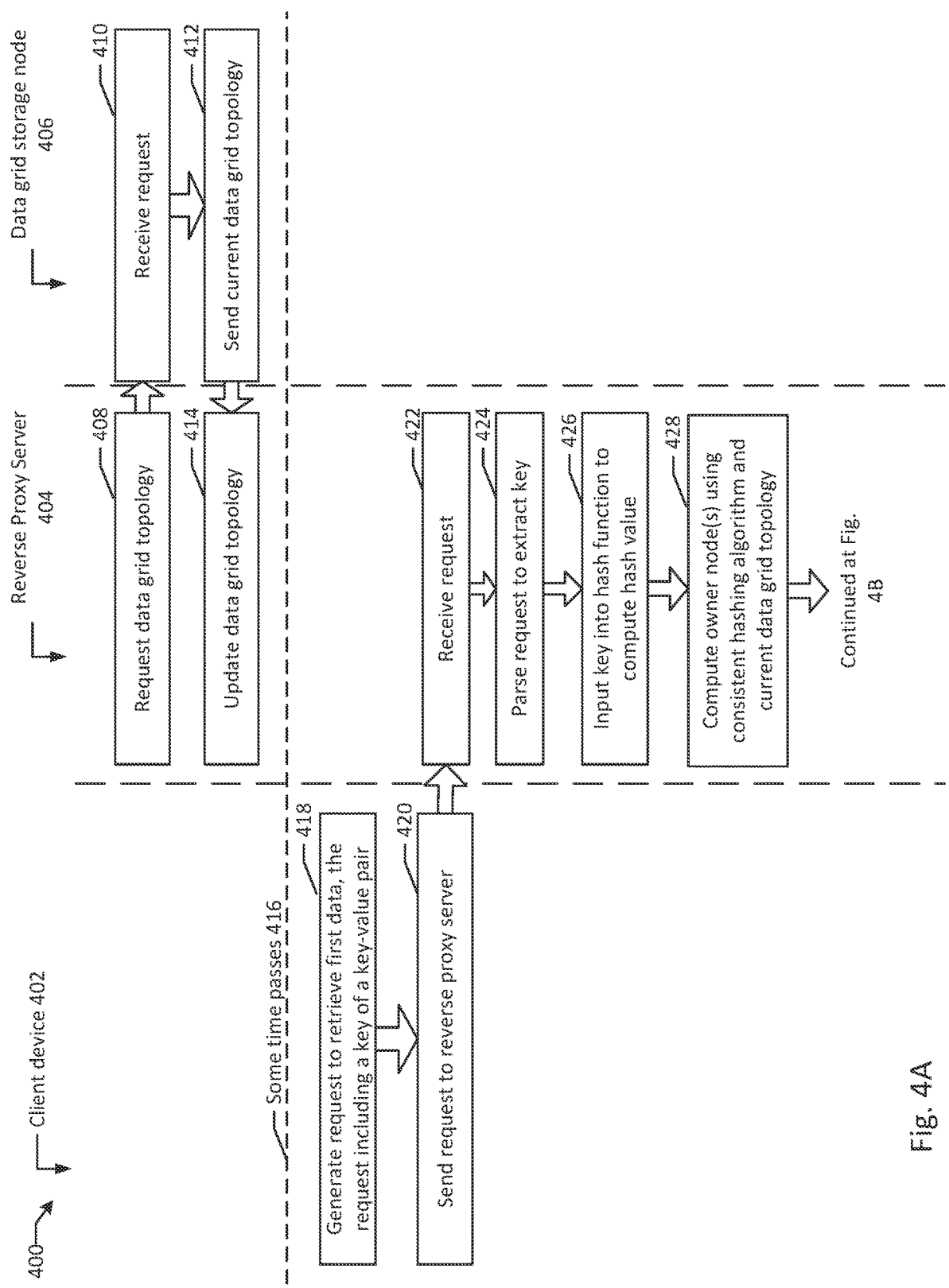
FIGS. 4A, 4B illustrate a flow diagram of an example request and retrieval of data stored by a distributed data grid executing on a container-based cluster, in accordance with various aspects of the present disclosure.
Figure 4B:
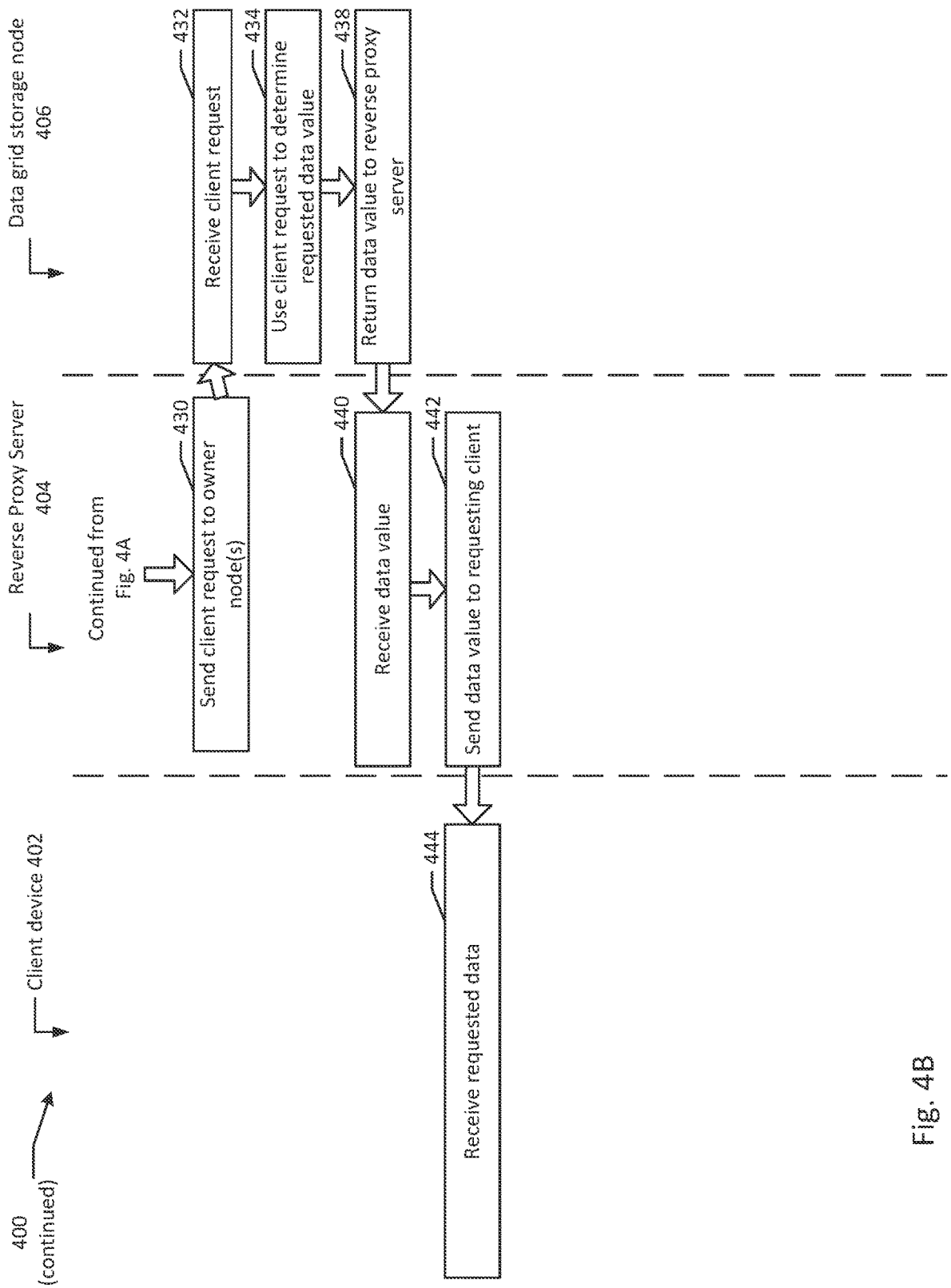

FIGS. 4A, 4B illustrate a flow diagram 400 of an example request and retrieval of data stored by a distributed data grid executing on a container-based cluster, in accordance with various aspects of the present disclosure. Although the examples below are described with reference to the flow diagram illustrated in FIGS. 4A and 4B, it will be appreciated that many other methods of performing the acts associated with FIGS. 4A and 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

A reverse proxy server 404 (e.g., executing on a container-based cluster of compute nodes managed using a container orchestration service) may request a data grid topology of a data grid provided by the cluster (block 408). In some examples, the reverse proxy server 404 may periodically request the data grid topology. The data grid topology may be requested so that reverse proxy server 404 may use a consistent hashing algorithm to determine the appropriate owner node(s) to which to route requests, as described in further detail below.

The data grid storage node 406 (e.g., a node of the data grid executing on the same cluster as the reverse proxy server 404) may receive the request (block 410) and may send the current data grid topology to the reverse proxy server 404 (block 412). In some examples, the data grid storage node 406 may send the current data grid topology whenever the data grid topology changes (e.g., when a data grid node is spun up and/or reaped). The reverse proxy server 404 may update the grid topology (e.g., stored in a memory associated with the reverse proxy server 404) based on the current data grid topology provided by the data grid storage node 406 (block 414).

In various examples, the reverse proxy server 404 may determine a hash value space (e.g., defined during configuration of the reverse proxy server 404) that includes a specified hash function and a range of hash values that can be computed using the hash function (e.g., integers ranging from 0–MAX_HASH_VALUE). The integer representing the maximum hash value (e.g., MAX_HASH_VALUE) may be partitioned into a number of segments (SEGMENTS_NUM) which may, in turn, be partitioned into the available nodes of the data grid (using the current data grid topology received from the data grid storage node 406). The partitioning of the segments into the available nodes of the data grid may be used to generate a segment-to-owner map that maps segments (or hash values) to owner nodes within the data grid. The segment-to-owner map may be updated whenever the data grid topology is updated.

Some time may pass as indicated by dashed horizontal line 416. At block 418, a client device 402 may generate a request to retrieve first data. The request may include a key of a key-value pair. The request may be sent to the reverse proxy server 404 (block 420). In some examples, the reverse proxy server 404 may expose an interface and the request may be received at the interface. At block 422, the reverse proxy server 404 may receive the request. The reverse proxy server 404 may parse the request to extract the key of the key-value pair (block 424). For example, the reverse proxy server 404 may determine a field of a payload of the request which is designated for keys to identify the key.

Reverse proxy server 404 may input the key into a hash function to compute a hash value (block 426). In various examples, the hash value may be used to determine a segment associated with the hash value. The segment S for the hash value HV may be computed as S=round (HV*SEGMENTS_NUM/MAX_HASH_VALUE).

The reverse proxy server 404 may compute the owner node(s) using the consistent hashing algorithm and the current data grid topology (block 428). For example, as described above, the reverse proxy server 404 may generate a segment-to-owner map using both the consistent hashing algorithm and the current data grid topology. Upon calculating the segment number S, the reverse proxy server may lookup the owner node(s) associated with the segment number S in the segment-to-owner map.

Processing may continue at block 430 of FIG. 4B. At block 430, the reverse proxy server 404 may send the client request to the owner node(s) that were determined. Data grid storage node 406 may receive the client request at block 432. The data grid storage node 406 may use the key included in the client request to lookup the value of the key-value pair (e.g., the requested data entry) (block 434). The data grid storage node 406 may return the data value to reverse proxy server (block 438). For example, the data grid storage node 406 may use intra-cluster communication provided by a control plane of the container orchestration software to send the data value back to the reverse proxy server 404. The reverse proxy server 404 may receive the data value (block 440) and may send the data value to the requesting client (block 442) in response to the client request. At block 444, the client device 402 may receive the requested data. Although not specifically shown, the same process may be used for storage of data in the data grid via the reverse proxy server 404.

FIG. 5 is block diagram 500 of a reverse proxy server 506 executing on a container-based cluster of compute nodes 502 and communicating with a client device 512, according to an example of the present disclosure. In various examples, the container-based cluster of compute nodes 502 may be managed using a container orchestration service 504 such as Red Hat® OpenShift® or Kubernetes®. The container-base cluster of compute nodes 502 may provide a data grid.

Client device 512 may send a first request 514 to the reverse proxy server 506. The first request 514 may be a request to retrieve data from a data grid provided by the container-based cluster of compute nodes 502 or may be a request to store data on the data grid. The first request 514 may include a key of a key-value pair 516. The key of the key-value pair 516 may be input by the reverse proxy server 506 into a hash function 518. The hash function 518 may output a hash value 520 in response to the input of the key of the key-value pair 516 into the hash function 518.

The reverse proxy server 506 may receive a current data grid topology 510 of the data grid provided by the container-based cluster of compute nodes 502. The data grid may include various data grid nodes, such as nodes 508a, 508b, . . . , 508n. The current data grid topology 510 may describe the topology of nodes 508a, 508b, . . . , 508n. The reverse proxy server 506 may generate a segment-to-owner map that maps each segment of the hash value space to a node owner among the nodes 508a, 508b, . . . , 508n of the data grid. The reverse proxy server 506 may use the consistent hashing algorithm 522 and the hash value 520 to determine an owner node associated with the hash value. For example, the hash value 520 may be used to compute a segment S that may be used to lookup the owner node in the segment-to-owner map. Thereafter, the first request 514' may be sent to the owner node. In the example depicted in FIG. 5, the owner node may be node 508n. A key included in first request 514' may be used by node 508n to retrieve the data associated with the first request 514'. In the example, the data may be first data 524. First data 524 may be sent from node 508n to reverse proxy server 506. Thereafter, reverse proxy server 506 may send the first data 524' to the client device 512 in response to the first request 514.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system including at least one processor and one or more memories coupled to the at least one processor, the system comprising:
   a container-based cluster of compute nodes managed using a container orchestration service; and
   a reverse proxy server executing on the container-based cluster of compute nodes, the reverse proxy server configured to:
      subscribe, using an event driven architecture, to receive a current data grid topology of the container-based cluster of compute nodes;
      receive, at a first time using the event driven architecture, a first data grid topology of the container-based cluster of compute nodes;
      generate a first segment-to-node map in response to receiving the first data grid topology;

receive, from a client device, a first request to retrieve first data from the container-based cluster of compute nodes, the first request comprising a key of a key-value pair;

compute a hash value by inputting the key into a consistent hashing function executed by the reverse proxy server, wherein the consistent hashing function partitions a hash value space into a plurality of segments, where the segments are mapped to current nodes identified using the first segment-to-node map;

determine at least one node among the container-based cluster of compute nodes associated with the hash value using the first segment-to-node map;

send the first request to the at least one node;

receive the first data from the at least one node in response to the first request;

send the first data to the client device;

receive, at a second time using the event driven architecture, a second data grid topology of the container-based cluster of compute nodes; and generate a second segment-to-node map in response to receiving the second data grid topology.

2. The system of claim 1, wherein the reverse proxy server is effective to determine the at least one node among the container-based cluster of compute nodes associated with the hash value by calculating a segment of the first segment-to-node map as a function of the hash value.

3. The system of claim 1, wherein the reverse proxy server is effective to:

receive a message from the container orchestration service indicating that a new node has been deployed on the container-based cluster of compute nodes; and update the second data grid topology based on the message.

4. The system of claim 1, wherein the reverse proxy server is further configured to:

receive, from the client device, a second request to store second data on the container-based cluster of compute nodes;

determine, using the consistent hashing function and the second data grid topology, at least a first node among the container-based cluster of compute nodes on which to store the second data; and sending the second data to the first node, wherein the first node is configured to store the second data.

5. The system of claim 1, wherein the reverse proxy server is further configured to:

determine that the hash value is associated with a first node and a second node;

determine, using the first data grid topology, that the second node is able to process the first request with less latency relative to the first node; and send the first request to the second node.

6. The system of claim 1, wherein the reverse proxy server sends the first request to an authentication layer of the container orchestration service.

7. The system of claim 6, wherein the reverse proxy server is further configured to:

expose an interface to the client device; and receive, at the interface from the client device, the first request, the first request further comprising an instruction to send the first request to an authentication and authorization layer of the container orchestration service.

8. A method comprising:

subscribing, by a reverse proxy server using an event driven architecture, to receive a current data grid topology of a container-based cluster of compute nodes;

receiving, by the reverse proxy server executing on the container-based cluster of compute nodes managed using a container orchestration service, a first data grid topology of the container-based cluster of compute nodes at a first time;

generating, by the reverse proxy server, a first segment-to-node map in response to receiving the first data grid topology;

receiving, by the reverse proxy server from a client device, a first request to retrieve first data from the container-based cluster of compute nodes, the first request comprising a key of a key-value pair;

computing, by the reverse proxy server, a hash value by inputting the key into a consistent hashing function executed by the reverse proxy server, wherein the consistent hashing function partitions a hash value space into a plurality of segments, where the segments are mapped to current nodes identified using the first segment-to-node map;

determining, by the reverse proxy server, at least one node among the container-based cluster of compute nodes associated with the hash value using the first segment-to-node map;

sending, by the reverse proxy server, the first request to the at least one node;

receiving, by the reverse proxy server, the first data from the at least one node in response to the first request;

sending the first data to the client device;

receiving, at a second time using the event driven architecture, a second data grid topology of the container-based cluster of compute nodes; and generating, by the reverse proxy server, a second segment-to-node map in response to receiving the second data grid topology.

9. The method of claim 8, further comprising determining the at least one node among the container-based cluster of compute nodes by calculating a segment of the first segment-to-node map as a function of the hash value.

10. The method of claim 8, further comprising:

receiving, by the reverse proxy server, a message from the container orchestration service indicating that a new node has been deployed or that a node has failed; and updating, by the reverse proxy server, the second data grid topology based on the message.

11. The method of claim 8, further comprising:

receiving, by the reverse proxy server from the client device, a second request to store second data on the container-based cluster of compute nodes;

determining, by the reverse proxy server using the consistent hashing algorithm and the second data grid topology, at least a first node among the container-based cluster of compute nodes on which to store the second data; and sending, by the reverse proxy server, the second data to the first node, wherein the first node is configured to store the second data.

12. The method of claim 8, further comprising:

determining, by the reverse proxy server, that the hash value is associated with a first node and a second node;

determining, by the reverse proxy server, using the first data grid topology, that the second node is able to process the first request with less latency relative to the first node; and sending, by the reverse proxy server, the first request to the second node.

13. The method of claim 8, further comprising sending the first request to an authentication layer of the container orchestration service.

14. The method of claim 13, further comprising:
exposing, by the reverse proxy server, an interface to the client device; and
receiving, at the interface from the client device, the first request, the first request further comprising an instruction to send the first request to an authentication and authorization layer of the container orchestration service.

15. A non-transitory machine readable medium storing a program which, when executed by a processor, causes a reverse proxy server executing on a container-based cluster of compute nodes to:
subscribe, using an event driven architecture, to receive a current data grid topology of the container-based cluster of compute nodes;
receive, at a first time using the event driven architecture, a first data grid topology of the container-based cluster of compute nodes;
generate a first segment-to-node map in response to receiving the first data grid topology;
receive, from a client device, a first request to retrieve first data from the container-based cluster of compute nodes, the first request comprising a key of a key-value pair, wherein the container-based cluster of compute nodes is managed using a container orchestration service;
compute a hash value by inputting the key into a consistent hashing function executed by the reverse proxy server, wherein the consistent hashing function partitions a hash value space into a plurality of segments, where the segments are mapped to current nodes identified using the first segment-to-node map;
determine at least one node among the container-based cluster of compute nodes associated with the hash value using the first segment-to-node map;
send the first request to the at least one node;
receive the first data from the at least one node in response to the first request;
send the first data to the client device;
receive, at a second time using the event driven architecture, a second data grid topology of the container-based cluster of compute nodes; and
generate a second segment-to-node map in response to receiving the second data grid topology.

16. The non-transitory machine readable medium of claim 15, which, when executed by the processor, further causes the reverse proxy server to determine the at least one node among the container-based cluster of compute nodes by calculating a segment of the first segment-to-node map as a function of the hash value.

17. The non-transitory machine readable medium of claim 15, which, when executed by the processor, further causes the proxy server to:
receive a message from the container orchestration service indicating that a new node has been deployed or that a node has failed; and
update the second data grid topology based on the message.

* * * * *